United States Patent
Perry

(10) Patent No.: US 7,021,172 B1
(45) Date of Patent: Apr. 4, 2006

(54) HYDRAULIC THROTTLE FOR VEHICLES

(76) Inventor: David S. Perry, P.O. Box 113064, Anchorage, AK (US) 99511

( * ) Notice: Subject to any disclaimer, the term of this patent is extended or adjusted under 35 U.S.C. 154(b) by 350 days.

(21) Appl. No.: 10/404,808

(22) Filed: Apr. 1, 2003

(51) Int. Cl.
*G05G 11/00* (2006.01)

(52) U.S. Cl. .......................... 74/486; 74/501.6; 74/488

(58) Field of Classification Search ............. 74/484 R, 74/485, 487, 486, 488, 489, 56, 57, 501.6, 74/516, 517, 518; 91/276, 423; 60/579, 60/594; 92/137
See application file for complete search history.

(56) References Cited

U.S. PATENT DOCUMENTS

| | | | | |
|---|---|---|---|---|
| 765,138 A | * | 7/1904 | Hedstrom | 123/335 |
| 2,703,557 A | * | 3/1955 | Polki | 91/276 |
| 3,060,688 A | * | 10/1962 | Gondek | 91/433 |
| 3,522,745 A | * | 8/1970 | Milosevic | 74/489 |
| 3,683,619 A | * | 8/1972 | Belart | 60/549 |
| 3,782,219 A | * | 1/1974 | Beck et al. | 74/531 |
| 4,287,785 A | * | 9/1981 | Hunt | 74/488 |
| 4,497,503 A | * | 2/1985 | Irwin | 180/335 |
| 4,499,728 A | * | 2/1985 | Therond | 60/570 |
| 5,072,588 A | * | 12/1991 | Lowder et al. | 60/571 |
| 5,083,432 A | * | 1/1992 | Nishii et al. | 60/560 |
| 5,443,134 A | * | 8/1995 | Gajek et al. | 188/344 |
| 5,813,230 A | * | 9/1998 | Hartl et al. | 60/591 |
| 6,550,245 B1 | * | 4/2003 | Nishii et al. | 60/553 |

* cited by examiner

*Primary Examiner*—David Fenstermacher
(74) *Attorney, Agent, or Firm*—Michael J. Tavella

(57) ABSTRACT

A hydraulically operated throttle system that has the hydraulic system components installed entirely within the throttle grip on the handlebar. A regular throttle cable is run through the frame/handlebar where it connects to the hydraulic system. A three-piston system is used to provide the control. One piston is connected to a disk cam. As the disk is turned (by turning the twist grip), the cam forces the first piston to move, which forces hydraulic fluid from a first cylinder into a secondary cylinder. This secondary cylinder contains a second piston, which is moved by the fluid from the first cylinder. As this second piston moves, hydraulic fluid moves third piston within a third cylinder. The third piston is attached to the throttle cable. As this piston moves within the third cylinder, it pulls or pushes the throttle cable, thereby opening or closing the throttle on the engine.

11 Claims, 7 Drawing Sheets

HYDRAULIC THROTTLE FOR VEHICLES

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to hydraulic throttles and particularly to hydraulic throttles for motorcycles and the like.

2. Description of the Prior Art

Motorcycles, three wheelers, and other types of all terrain vehicles are typically operated by a hand-operated throttle that is placed on a vehicle's handlebar. These throttles are cylinders that extend outward from the handlebar. The user typically grips the throttle and rotates it from front to back. The throttle is connected to a cable that extends from the handlebar to the engine, where it connects to the throttle plate control. As the throttle is turned, the cable is extended or contracted. This, in turn, opens and closes the throttle plate on the engine. The problem with this design is that it relies on a cable that is normally exposed as it travels from the handlebars down to the engine. Although the cable is often secured to the frame, it is exposed to damage, and to the elements. Thus, it becomes a maintenance item. From an aesthetic point of view, it is also not attractive to have cables hanging from the handlebars as it often detracts from the appearance of the motorcycle.

Placing the throttle cable within the handlebar removes the cable from view. It also protects it from damage and exposure. To install the cable in the handlebar, however, it is necessary to modify the throttle grip itself to accommodate this change. One such change involves the use of hydraulics. For example, U.S. Pat. No. 4,633,726 to Chang teaches a hydraulic throttle for use on motorcycles. It uses a throttle grip that contains hydraulic piston system. These pistons are connected to hydraulic lines that feed into a second hydraulic system that operates the throttle. Another example of hydraulic control is found in U.S. Pat. No. 5,443,134 to Gajak et al. In this patent, a bicycle hand break is attached to a hydraulic cylinder that is then connected by a hydraulic line to the main hydraulic operating system on the bicycle break.

Both of these systems substitute hydraulic lines for cables. Although this is one solution, it is not necessarily a good one. Replacing the cables with hydraulic lines adds to the complexity of the system, as well as replacing one maintenance problem with an even bigger one.

BRIEF DESCRIPTION OF THE INVENTION

The instant invention overcomes these difficulties. It replaces the normal twist throttle with a hydraulic throttle, but it maintains the use of cables to operate the system. Because hydraulics are used, it is possible to route the throttle cable through the handlebar, thereby protecting it from damage and the elements. It also maintains a cable system, that despite its maintenance problems (now notably reduced) is simpler and less likely to fail than a more complex hydraulic system as those described above.

The system uses a twist grip that uses hydraulic cylinders and pistons to operate the throttle. Unlike some of the prior art systems that run hydraulic lines from the throttle control in the handlebars to the throttle itself, the instant invention keeps the hydraulic system entirely within the throttle grip on the handlebar. A regular throttle cable is run through the frame/handlebar where it connects to the hydraulic system.

The system is designed to be run in a master-slave relationship. A three-piston system is used to provide the control. One piston is connected to a disk cam. As the disk is turned (by turning the twist grip), the cam forces the first piston to move. As this piston moves, it forces hydraulic fluid from a first cylinder into a secondary cylinder. This secondary cylinder contains a second piston, which is moved by the fluid from the first cylinder. As this second piston moves, hydraulic fluid moves third piston within a third cylinder. The third piston is attached, through as set of seals, to the throttle cable. As this piston moves within the third cylinder, it pulls or pushes the throttle cable, thereby opening or closing the throttle on the engine.

The use of this master-slave arrangement allows for significant movement of the third piston for a relatively small movement in the twist grip. This allows a user to operate the throttle grip in a normal manner, while the system provides full throttle action.

In a second embodiment, an overflow cylinder is provided to adjust for variation in throttle cables and other factors. In this design, if the third piston is at the top of the third cylinder by the twist grip is not at the maximum rotation, additional rotation of the twist grip forces the hydraulic fluid into an auxiliary cylinder that has a piston retained by a spring. Any excess fluid causes this piston to move, which compresses the spring. Because the spring is in place, the fluid moved into the third cylinder because of the lack of resistance. It is only after the third piston cannot move further that the auxiliary cylinder comes into play.

DETAILED DESCRIPTION OF THE INVENTION

Figure 1:
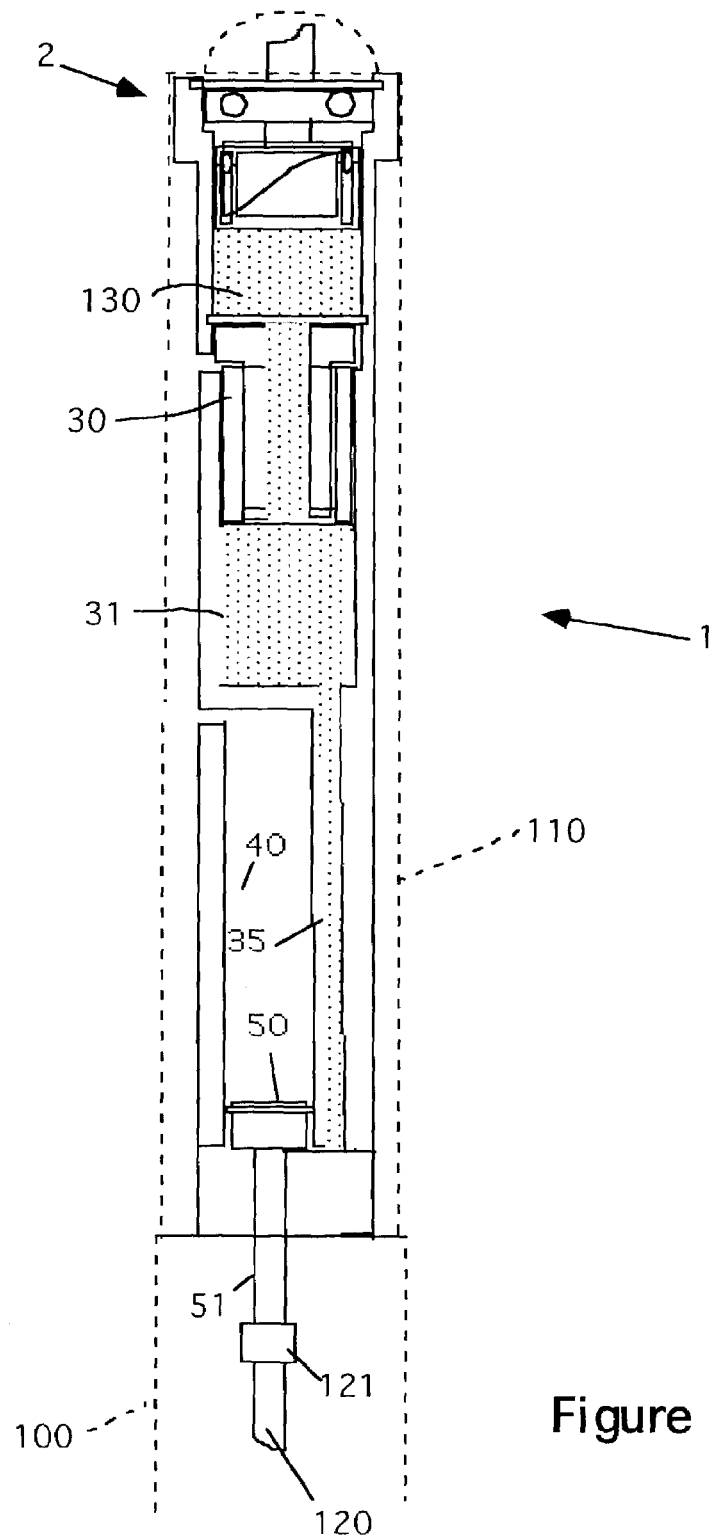
FIG. 1 is a cross-sectional view of the invention installed in a throttle grip and handlebar, with the throttle shown in the off position.

Referring now to the drawing figures, the invention 1 is shown. FIG. 1 is a cross-sectional view of the invention installed in a throttle grip 110 of a handlebar 100 (note these are shown in dashed lines in the figure). This figure shows all of the basic assemblies. The system 1 is mounted to a vehicle's handlebar 100. Typically, the upper control mechanism 2 is secured in a twist grip 110 of the vehicle. This grip is common to the art and is designed to rotate about the handlebar 100. Typically, when the twist grip is rotated forward, the throttle is closed. As the twist grip is rotated back, the throttle opens. Because of the limitations of the human wrist, the twist grip is designed to go from closed to full throttle in about 90 degrees of rotation. As discussed below, this limitation has an impact on the design of the system.

The throttle lever on the engine is controlled by a cable 120. This cable is identical to those currently used on motorcycles and other such vehicles. The connection to the throttle lever on the engine is not shown because this connection is identical to that in current use and is well within the ordinary skill in the art. One difference, however, is the placement of the cable. On existing vehicles, this cable is usually run outside along the frame and handlebars of the vehicle. In this design, the cable 120 is run inside the handlebar 100 as shown. The cable either can then exit at the base of the handlebar, or can further route through the frame, where it can exit near the engine. Running the cable in this manner serves two purposes. First, it protects the cable from damage. Second, it improves the appearance of the vehicle because there is no cable that must be secured to the handlebar. The installation of the cable 120 beyond the connection to the throttle system 1 uses techniques common to the art and well known to people of ordinary skill in the art.

FIG. 1 shows that the cable 120 has a connection fitting 121 mounted on its end. The connection fitting 121 is then attached to the shaft 51 of the third piston 50. Use of the third piston is discussed below.

In addition, as shown in FIG. 1, the assembly 2 is fitted into a cavity within the twist grip 110. The twist grip 110 is then secured to the end of the handlebar using ordinary means in the art.

Figure 3:
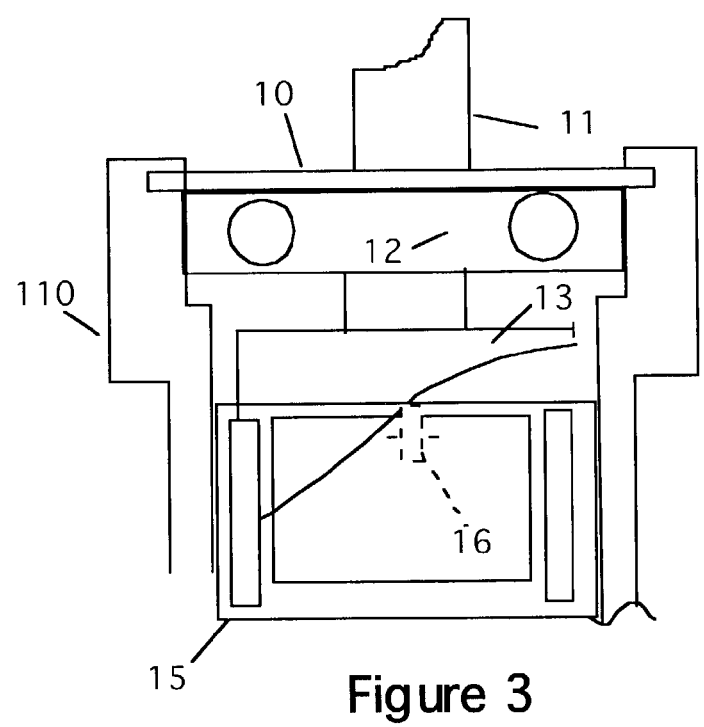
FIG. 3 is an enlarged view of the cam-piston system that operates as the primary operating system, with the piston shown in the throttle off position.
Figure 4:
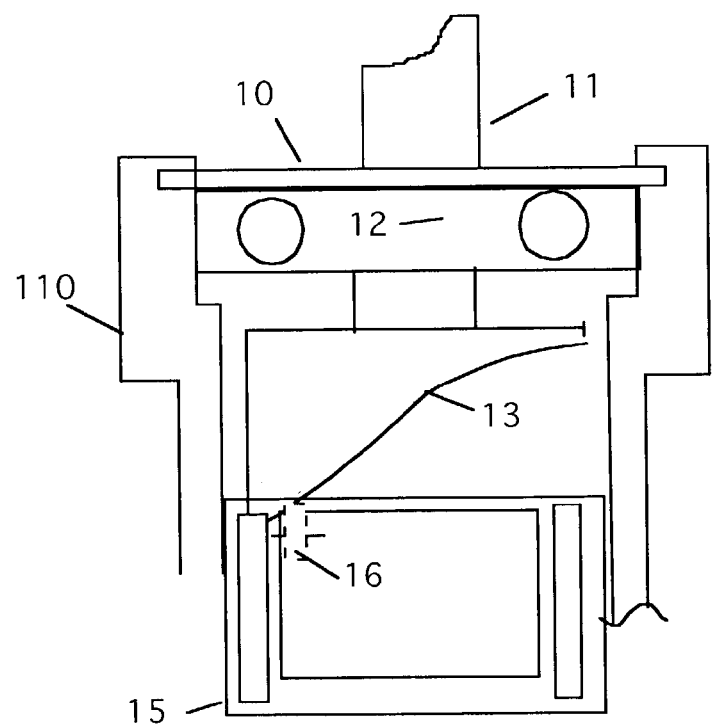
FIG. 4 is an enlarged view of the cam-piston system that operates as the primary operating system, with the piston shown in the throttle on position.
Figure 5:
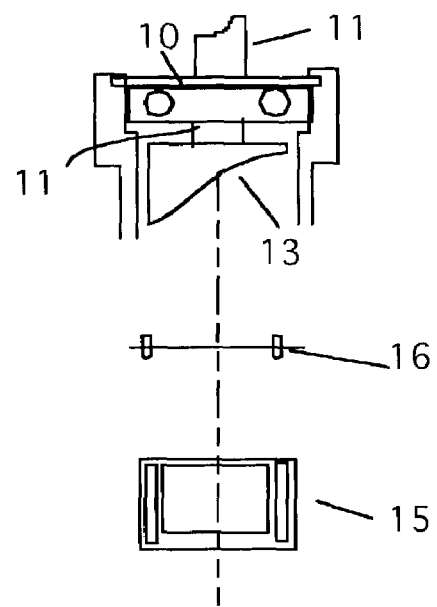
FIG. 5 is an exploded view of the upper portion of the invention.
Figure 5:
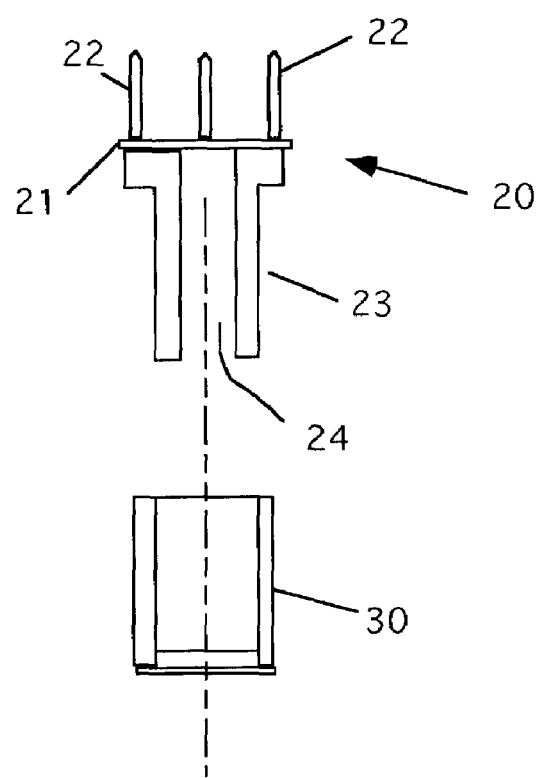

FIGS. 3 and 4 and 5 show details of the upper assembly 2 are enlargement of the throttle grip portion of the invention. Here, additional details of the upper control assembly 2 are shown. At the upper end of the figure is a grip plate 10 that fits into a groove in the twist grip 110 as shown. A post 11 extends from this plate to fit into the end of the twist grip. The plate has a lower spacer portion 12 that extends down into the grip as shown. The post 11 extends down through the spacer portion and attaches to a cam 13 (see FIG. 5).

Figure 6:
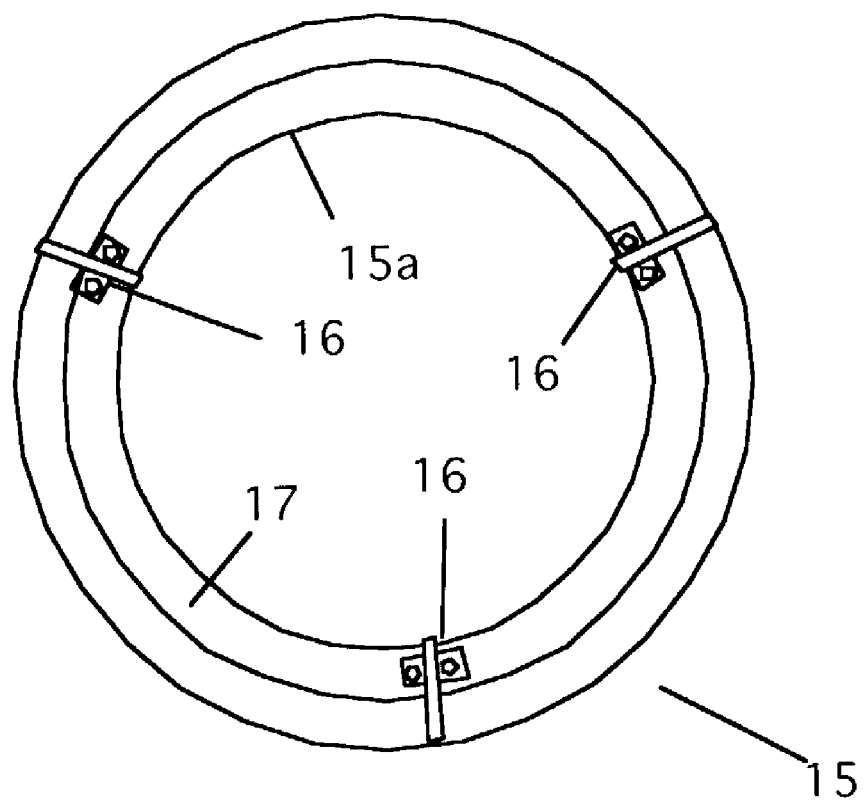
FIG. 6 is a top view of the first piston showing the cam drive placement.

A first piston assembly 14 is made up of a piston 15 and a cam follower 16. See FIG. 5. As shown in FIG. 6, the piston 15 has a groove 17 in which the cam rests when the unit is assembled (see e.g., FIG. 3). This cam structure is discussed in more detail below. The piston 15 is prevented from rotating by the flow tube assembly 20. This assembly is fixed in place and is installed below the first piston. This assembly consists of a top plate 21, which has three vertical posts 22 extending upwards therefrom. These posts fit inside the first piston 15. The first piston 15 rides on these posts. In this way, the cam followers can follow the cam and cause the first piston to move downward. FIG. 4 shows the cam follower having followed the cam 13, as it is turned, with the piston 15 having moved lower from its initial position as shown in FIG. 3. Note that the posts also keep the first piston from turning as the twist grip is turned. Otherwise, the piston 15 would turn with the twist grip and no throttle action would take place. Beneath the top plate 21 is a flow tube chamber 23 that has a central opening or flow "tube" 24 that moves hydraulic fluid from the upper chamber 25 to the lower cylinder 31, as discussed below. The flow tube chamber 23 is a cylindrical body about which the second piston 30 fits.

Note that in all the views, the structure of the cam is simplified somewhat. In the preferred embodiment, three cams 13 are formed in a circle that aligns with the cam followers 16 shown in FIG. 6. Each of the three cams extends from a high position to low position in 120 degrees of rotation. This provides the most compact way of turning the throttle while still producing full movement of the throttle cable. The cams are designed to move the main piston from its upper position in the cylinder to its lowest piston in the cylinder in about ¼ turn of the twist grip. This is discussed further below.

Figure 2:
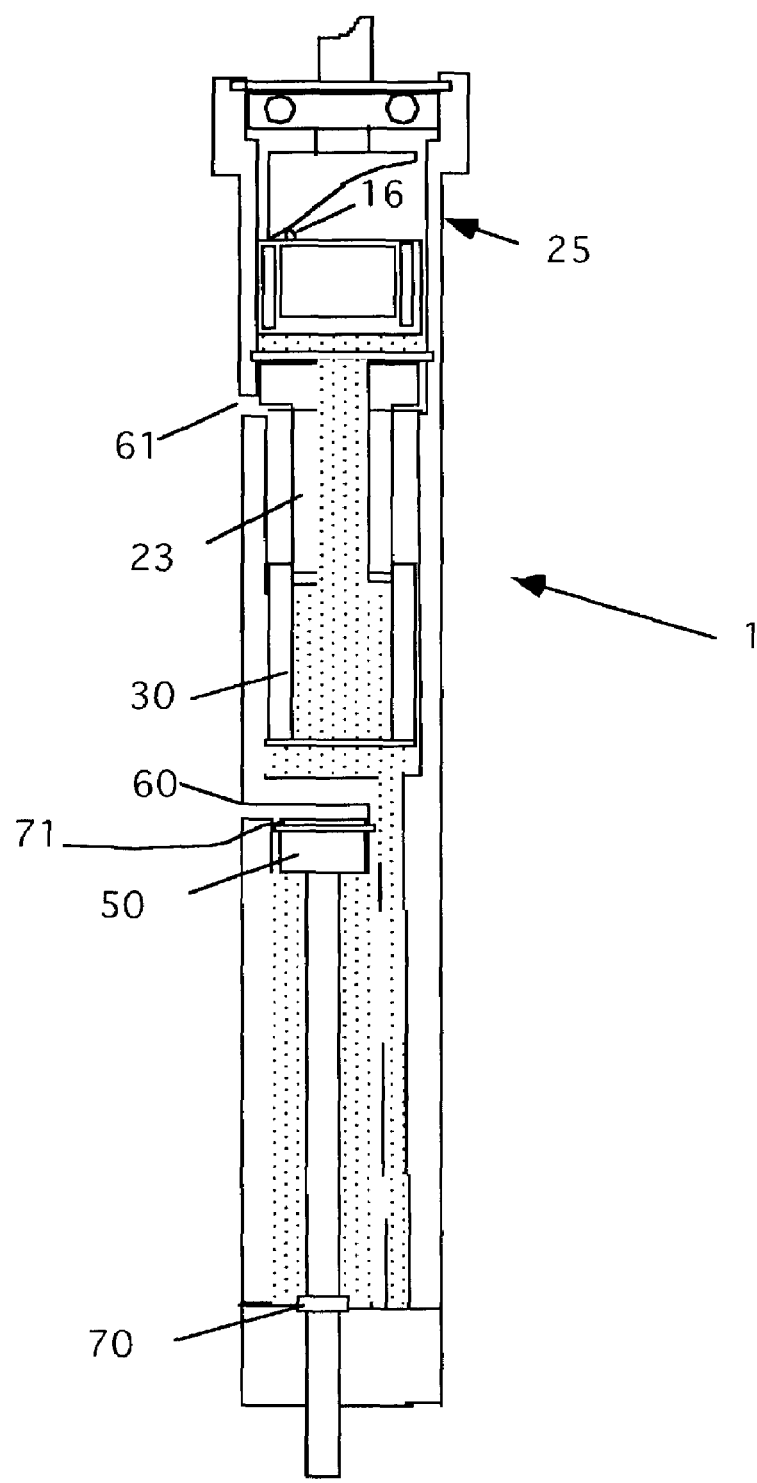
FIG. 2 is a cross-sectional view of the invention installed in a throttle grip and handlebar, with the throttle shown in the full-on position.

FIGS. 1 and 2 show the lower parts of the system. The flow tube assembly 20, as mentioned above, is fixed in place. Under this assembly is a chamber that forms the lower cylinder 31 for the second piston 30. Note that hydraulic fluid 130 is shown in place in these cylinders, as is the case in normal operation. The lower chamber 31 has an opening in its bottom that allows fluid to descend through a tube 35 to the throttle drive cylinder 40. In this cylinder, the third piston 50 is placed, as discussed above.

As mentioned above, FIG. 1 shows the system with the throttle off. In this position, the first piston is shown in its fully up position. The second piston 30 is shown full up, surrounding the flow tube 23 and the third piston is resting at the bottom of the throttle drive cylinder 40 as shown. Hydraulic fluid 130 is placed in the system, ready for use.

FIG. 2 shows the system at near full throttle. In this view, the cam 13 has rotated, the cam followers follow the movement of the cam, which causes the first piston 15 to be pushed down as shown. This action forces hydraulic fluid 130 down through the flow tube 23. This fluid pushes against the second piston 30, which pushes it down into the lower cylinder as shown. This action then forces fluid from the lower cylinder through the tube 35, against the bottom of the third piston 50. As the fluid descends, it forces the third piston 50 up to the top the throttle drive cylinder 40 as shown in the figure. As the third piston is raised into the throttle drive cylinder 40, the shaft 51 pulls on the throttle cable 120, causing the throttle to open. As shown, the third piston 50 is at the top of the cylinder and the throttle is fully open.

Note that two vents 60 and 61 are provided in the housing to equalize air pressure within the cylinder so that the system can operate to push the secondary piston back down when the twist grip rotates to close the throttle.

Note that a number of seals are placed around the system to restrict the flow for fluid to those areas where it is desired. For example, base seal 70 is used to seal the exit of the shaft 51. A seal 71 seals the third piston to keep the fluid below the piston. Similarly, seals are used to seal the other cylinders in the same way, according to common practice in the art. Note that the seals are either "o" ring type or lip ring type, both of which are common to the art.

As discussed above, FIG. 6 shows set of three cam followers 16 that are mounted on top of the first piston 15. These cams ride in a groove 17 as shown. In the preferred embodiment, this groove is formed in the piston, creating an inner section 15a that is solid, and an outer section 15b and a groove 17. The groove 17 is cut into the main piston to within 3–4 mm of the bottom of the piston. The cam followers 16 are positioned inside the top groove at 120-degree intervals. Each cam follower is contained in the groove with an axel pin as shown. The axel pins allow the cam followers to rotate as the cam lobes rotate over them and force the main piston to move down into its cylinder. The groove 17 is deep. This is done to accommodate the three cams. Thus, the highest portion of each of the cams fits into the bottom of the groove. Each can then slopes upward (following the diameter of the groove) until its lowest portion extends up, out of the groove and on top of one of the three cam followers. This is done to reduce the space requirements to the fullest extent possible.

As the twist grip is turned, the spline is turned, which in turn moves the cams along the cam follower surfaces. When the first piston is in the upper position within its cylinder the throttle is at its minimum position. As the twist grip it turned, the cams move over the cam followers, from high to low. As the cams move against the cam followers, the first piston is pushed down, because there is no place for the cams to move outward. As discussed above, when the twist grip is turned to the point where the first piston is in its lowest position, the throttle is fully opened. The twist grip is designed to stop further forward movement at this point.

Figure 7:
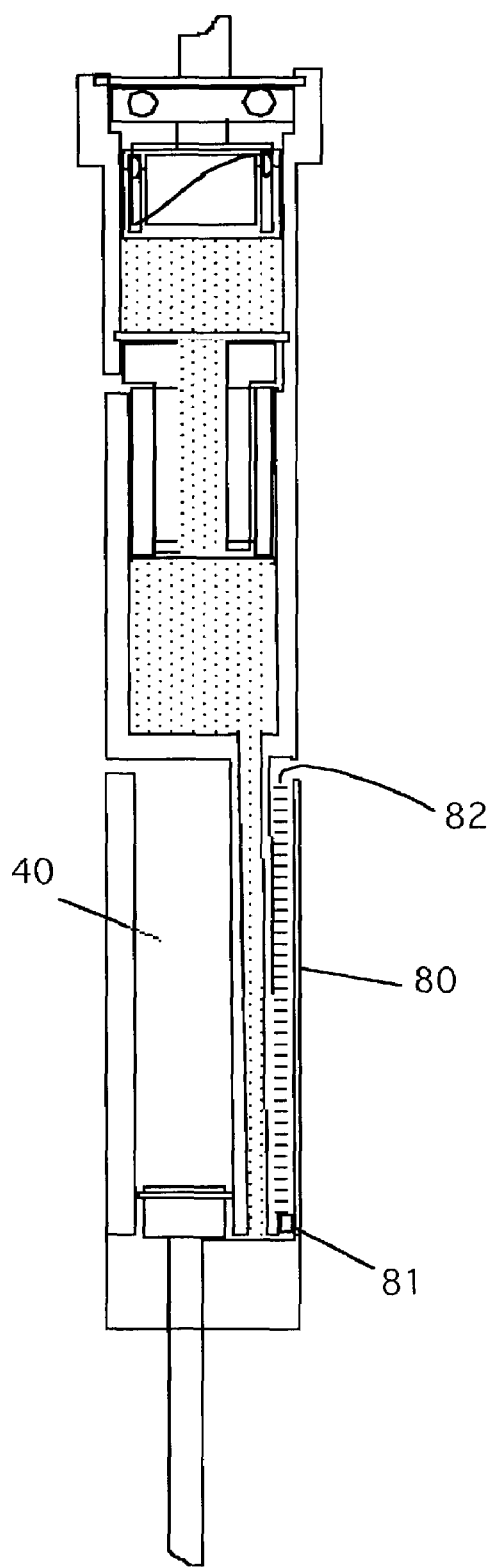
FIG. 7 is a cross-sectional view of a second embodiment of the invention with the throttle shown in the off position.
Figure 8:
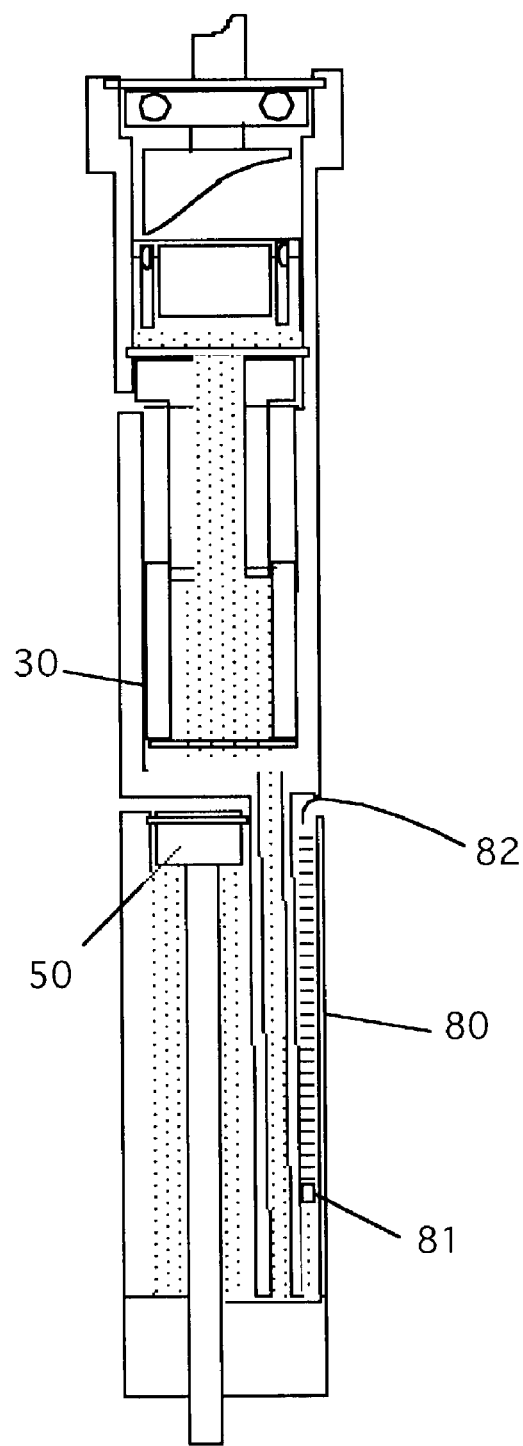
FIG. 8 is a cross-sectional view of a second embodiment of the invention with the throttle shown in the full-on position.

FIGS. 7 and 8 show a second embodiment. Here, an auxiliary cylinder 80 is formed on the housing as shown. A small opening allows fluid communication with this chamber. A slug 81 mounted on the bottom of a spring 82 is placed in the chamber as shown. The use of this auxiliary chamber is for occasions when the third piston has reached the top of the throttle drive cylinder 40, but the twist grip has not completed its full rotation. Further rotation of the twist grip forces remaining fluid through the small opening into the chamber, where it pushes against the slug 81. The pressure overcomes the spring tension, causing the spring 82 to compress. As the twist grip is backed off, the pressure falls and the spring forces the slug back to its "at rest" position. Note that under ordinary circumstances, the slug should move only slightly, if at all. FIG. 8 shows the condition of the overly turned twist grip. FIG. 7 shows the throttle off position.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A hydraulic throttle for vehicles having a handlebar comprising:
    a) a twist grip having an open interior and being rotatably installed on said handlebar;
    b) a hydraulic piston assembly, installed within said twist grip; and
    c) a throttle cable, attached to said hydraulic piston assembly, whereby said throttle cable is contain within said handlebar.

2. The hydraulic throttle for vehicles of claim 1 wherein the hydraulic piston assembly comprises:
    a) an outer housing;
    b) a first cylinder, formed in said outer housing;
    c) a first piston, slidably installed in said first cylinder;
    d) a means for moving said first piston within said first cylinder when said twist grip is rotated;
    e) a second cylinder, formed in said outer housing;
    f) a channel formed in said housing, connecting the first cylinder to said second cylinder;
    g) a second piston slidably installed in said second cylinder;
    h) a second channel connecting said second cylinder to a third cylinder, formed in said outer housing;
    i) a third piston, slidably installed in said third cylinder; and
    j) a means for connecting said throttle cable to said third piston.

3. The hydraulic throttle for vehicles of claim 2 wherein the means for moving said first piston within said first cylinder when said twist grip is rotated include a cam assembly.

4. The hydraulic throttle for vehicles of claim 2 wherein the means for connecting said throttle cable to said third piston comprise:
    a) a shaft, fixedly attached to said third piston and extending outwardly therefrom; and
    b) a means for clamping said throttle cable to said shaft.

5. The hydraulic throttle for vehicles of claim 3 further comprising:
    a) a disk plate fixedly installed in said outer housing, and having at three contact arms attached thereto and extending upwardly therefrom;
    b) whereby said first piston is positioned with respect to said disk plate such that said first piston is slidably attached to said three contact arms.

6. The hydraulic throttle for vehicles of claim 5 wherein the cam assembly comprises:
    a) a disk, having at least one cam formed thereon;
    b) a means for securing said disk to said twist grip; and
    c) a means for engaging the cam, attached to said first piston, such that as said twist grip is rotated, said first piston is moved from a first position to a second position.

7. A hydraulic throttle for vehicles having a handlebar comprising:
    a) a twist grip having an open interior and being rotatably installed on said handlebar;
    b) an outer housing;
    c) a first cylinder, formed in said outer housing;
    d) a first piston, slidably installed in said first cylinder, said first piston having a generally cylindrical body, said generally cylindrical body having a groove circumferentially formed therein;
    e) a means for moving said first piston within said first cylinder when sold twist grip is rotated, said means including at least one cam follower, installed on said first piston, wherein said cam follower is positioned within said groove;
    f) a second cylinder, formed in said outer housing;
    g) a channel formed in said housing, connecting the first cylinder to said second cylinder;
    h) a second piston, slidably installed in said second cylinder;
    i) a second channel connecting said second cylinder to a third cylinder, formed in said outer housing;
    j) a third piston, slidably installed in said third cylinder; and
    k) a throttle cable, attached to said third piston, whereby said throttle cable is contain within said handlebar.

8. The hydraulic throttle for vehicles of claim 7 further comprising:

a) a disk plate fixedly installed in said outer housing, and having at three contact arms attached thereto and extending upwardly therefrom;
b) whereby said first piston is positioned with respect to said disk plate such that said first piston is slidably attached to said three contact arms.

9. The hydraulic throttle for vehicles of claim 7 wherein the means for moving said first piston within said first cylinder when said twist grip is rotated further comprise: a cam, rotatably attached to said twist grip, said cam having a sloped lobe surface being positioned within said circumferential groove of said first piston such that said sloped lobe is in contact with said cam follower, whereby when said twist grip is rotated, said sloped cam lobe moves over said cam follower, causing said first piston to be pushed downward.

10. A hydraulic throttle for vehicles having a handlebar comprising:
   a) a twist grip having an open interior and being rotatably installed on said handlebar;
   b) an outer housing;
   c) a first cylinder, formed in said outer housing;
   d) a first piston, slidably installed in said first cylinder, said first piston having a generally cylindrical body, said generally cylindrical body having a groove circumferentially formed therein;
   e) a means for moving said first piston within said first cylinder when said twist grip is rotated, said means including at least one cam follower, installed on said first piston, wherein said cam follower is positioned within said groove;
   f) a second cylinder, formed in said outer housing;
   g) a channel formed in said housing, connecting the first cylinder to said second cylinder;
   h) a second piston, slidably installed in said second cylinder;
   i) a second channel connecting said second cylinder to a third cylinder, formed in said outer housing;
   j) a third piston, slidably installed in said third cylinder, said third piston having a shaft, fixedly attached to said third piston and extending outwardly therefrom;
   k) a throttle cable, having a connection end, said throttle cable being contained within said handlebar; and
   l) a means for clamping said connection end of said throttle cable to said shaft.

11. The hydraulic throttle for vehicles of claim 10 further comprising:
   a) an auxiliary cylinder, having a conduit connecting to said second channel thereby allowing fluid communication between said second channel and said auxiliary cylinder;
   b) a weight, slidably placed in said auxiliary cylinder; and
   c) a spring fixedly placed within the auxiliary chamber above said weight.

* * * * *